United States Patent [19]

Williams

[11] 4,259,414

[45] Mar. 31, 1981

[54] NON-AIR POLLUTING, NON-PYROLYTIC UPGRADING OF COAL FOR CLEANER AND MORE EFFECTIVE ELECTRICAL POWER GENERATION

[75] Inventor: Richard Williams, Princeton, N.J.

[73] Assignee: RCA Corporation, New York, N.Y.

[21] Appl. No.: 98,695

[22] Filed: Nov. 29, 1979

[51] Int. Cl.$^3$ ............................................. H01M 8/06
[52] U.S. Cl. ...................................... 429/17; 429/19; 429/20; 429/26
[58] Field of Search ....................... 429/17, 19, 20, 26; 423/415 A, 657; 252/373; 48/204, 206, 202; 208/8 R

[56] References Cited

U.S. PATENT DOCUMENTS

| | | | |
|---|---|---|---|
| 2,570,543 | 10/1951 | Gorin | 429/17 |
| 2,741,549 | 4/1956 | Russell | 423/415 A X |
| 3,296,449 | 1/1967 | Plust et al. | 429/17 X |
| 3,446,609 | 5/1969 | Reinmuth et al. | 423/415 A X |
| 3,479,149 | 11/1969 | Frilette | 423/415 A |
| 3,741,809 | 6/1973 | Anbar | 429/20 X |
| 4,040,976 | 8/1977 | Greene | 423/415 A X |
| 4,042,755 | 8/1977 | Anbar | 429/16 |
| 4,160,816 | 7/1979 | Williams et al. | 204/72 X |

OTHER PUBLICATIONS

Power Sources Symposium Proceedings, 26, 175–177, (1974), Fuel Cell Session, The Formate–Air Primary Battery and Fuel Cell, C. H. Hamann et al.

Hydrocarbon Fuel Cell Technology Symposium, Atlantic City, N.J., (1965), Formate–Ion–Oxygen Fuel Cells, P. G. Grimes et al., pp. 121–130.

Energy, vol. II, Non–nuclear Energy Technologies, S. S. Penner et al., pp. 290–294.

Thorpe's Dictionary of Applied Chemistry, vol. V, Fourth Edition, Longmans, Green and Co., pp. 489–503.

Primary Examiner—Anthony Skapars
Attorney, Agent, or Firm—Birgit E. Morris; Allen Bloom

[57] ABSTRACT

A non-polluting, non-pyrolytic process to increase the electrical energy derived from coal comprises the reacting of coal with water at a sufficient temperature to form carbon monoxide and hydrogen with the further processing of the carbon monoxide to formate and the reacting of the formate and the hydrogen in separate fuel cells to generate electric current, water, and hydroxide, wherein the water and the hydroxide are recycled back into the initial coal-water reaction and the carbon monoxide-hydroxide reaction to provide further feedstocks for electrical power generation. Since the process does not involve combustion, the common air-pollutants, such as oxides of nitrogen and linear and aromatic carbonaceous free radicals, are not released into the atmosphere.

5 Claims, No Drawings

NON-AIR POLLUTING, NON-PYROLYTIC UPGRADING OF COAL FOR CLEANER AND MORE EFFECTIVE ELECTRICAL POWER GENERATION

This invention relates to a method of producing electricity. More specifically, this invention relates to a method of producing electricity from coal.

BACKGROUND OF THE INVENTION

Coal has been used for over 100 years to generate thermal electric power. The coal is burned to heat water, which drives a turbine and generates electricity. Coal-fired steam turbine generating plants convert about 30 percent of the coal's energy into electric power. The coal-fired generation of electricity produces tons of air pollutants yearly. The oxides of nitrogen generated upon the burning of coal react with sunlight to form photochemical smog. Sulphates and sulphites released into the atmosphere from the combination react with water vapor in the atmosphere to form sulphurous and sulphuric acid, which returns to earth as an acid rain causing corrosive damage to buildings and other property and requiring millions of dollars of protective maintenance and replacement of damaged property. Due to the unpleasant by-products of coal-fired generated electric power, most of the recently constructed coal-fired generating plants are located in areas of low population density, far from the situs of electrical use. The transmission of the electricity from the situs of manufacture to the situs of use further reduces the efficiency of the conversion process.

Much current research is directed towards alternative ways to extract energy from coal without the air pollution and other problems associated with coal-fired generation of electricity. Research efforts have been directed toward extracting liquid hydrocarbons from coal or converting coal into carbonaceous gases to generate electric power. Although these projects hold promise of reducing the need and dependency on oil for the generation of electricity, the products of the coal gasification and liquefaction research would still involve the burning of the converted product to form electricity. The burning process will still create the oxides of nitrogen and other free-radical smog problems.

Thus, it would be highly desirable to have a process of converting coal into electricity which will minimize or eliminate the generation of air pollutants. It would also be highly desirable to increase the amount of electricity generated from coal.

SUMMARY OF THE INVENTION

A non-air polluting, non-pyrolytic process for upgrading coal for cleaner and more efficient generation of electricity comprises the reaction of coal with water at a sufficient temperature to form carbon monoxide and hydrogen, reacting the carbon monoxide with a hydroxide to form a formate and the reaction of the formate and hydrogen in separate fuel cells to generate electricity, water for introduction into the initial coal reaction, and hydroxide for introduction into the formate-forming reaction. The process can convert coal into electric energy at an efficiency of about 50 percent as opposed to a 30 percent efficiency for the conversion of coal into electricity by combustion and steam turbines.

DETAILED DESCRIPTION OF THE INVENTION

The present process provides an efficient and environmentally clean method of generating electricity from coal.

The key to my invention resides not in the specific use of fuel cells or the conversion of coal to carbon monoxide and hydrogen, known as the water-gas reaction, but rather the coupling together of a series of reactions not heretofore taught in the art. The synthesized process permits the recycling of the products of one reaction as the reactants of another reaction in the process, while generating electricity at efficiencies which can be on the order of twice as high as polluting, combustion-fired steam coal generation.

The process involves heating coal with air, superheated steam or by other suitable means to a temperature of about 1000° C. or greater and thereafter passing steam at that temperature over the coal to form carbon monoxide and hydrogen in accordance with the following equation:

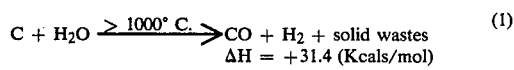
$$C + H_2O \xrightarrow{\geq 1000° C.} CO + H_2 + \text{solid wastes} \quad (1)$$
$$\Delta H = +31.4 \text{ (Kcals/mol)}$$

The gaseous products from the reaction are separated into carbon monoxide and hydrogen. The solid wastes known as clinkers are removed from the reaction chamber. If desired, the sulfur and other impurities which dissolve in the steam upon cooling can be separated by conventional methods. The hydrogen is introduced into a hydrogen-oxygen fuel cell. The gaseous hydrogen is injected at the anode and oxygen is injected at the cathode. In a spontaneous fuel cell, the anode is the negative terminal and the cathode is the positive terminal. The hydrogen is ionized with the release of two electrons per molecule of gas ionized according to the following equation:

$$H_2(G) \rightarrow 2H^+ + 2e^- \quad (2)$$

The electrons then pass through an external circuit while the H+ ions move to the cathode through the electrolyte. It is the transfer of the electrons that provides the electricity or electric power generated by the cell. The overall reaction proceeds in accordance with the following reaction equation:

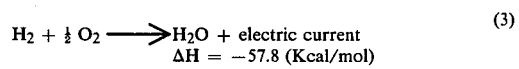
$$H_2 + \tfrac{1}{2} O_2 \longrightarrow H_2O + \text{electric current} \quad (3)$$
$$\Delta H = -57.8 \text{ (Kcal/mol)}$$

Excess heat created during the fuel cell reaction is used to preheat by heat exchange means known in the art to heat the water which is recycled back into the coal-water reaction (1).

The carbon monoxide separated from the hydrogen in the coal-water reaction (1) is reacted with an appropriate hydroxide, such as sodium hydroxide, potassium hydroxide, and like materials, at a pressure of about 100 psi and a temperature of about 125°–150° C. On being dissolved in water, the product forms the formate ion plus the cation species of the hydroxide. For example, carbon monoxide and sodium hydroxide form sodium formate. The reaction proceeds according to the following equation:

$$CO + NaOH \rightarrow HCOONa \quad \Delta H = -26.6 \text{ (Kcal/mol)} \quad (4)$$

Since the formation of the sodium formate is exothermic as indicated from the heat of reaction, the heat created is used by a heat exchanger means to help preheat the coal-water reaction given in equation (1).

Thereafter, the sodium formate is reacted with oxygen in a fuel cell. The products of the reaction are sodium hydroxide, which is recycled back into the carbon monoxide-hydroxide reaction (4), carbon dioxide which is vented, and electricity. The overall reaction proceeds according to the following equation:

$$HCOONa + \tfrac{1}{2} O_2 \longrightarrow NaOH + CO_2 + \text{electric current} \quad (5)$$
$$\Delta H = -41 \text{ (Kcal/mol)}$$

The fuel cell anode for the formate reaction can be of sintered nickel with a palladium-platinum catalyst or like materials while the cathode for the oxygen reduction can be teflon (PTFE) bonded with activated charcoal or platinum-palladium mixtures such as a 40 milligram palladium-20 milligram platinum per inch catalyst.

The carbon dioxide can be used in the formation of formic acid as an energy storage medium as taught in U.S. Pat. No. 4,160,816, and incorporated herein by reference.

It should be noted that the conversion of coal to feedstock fuels, $H_2$ and formate, uses only 4.8 K/cals per mol net, or about 5 percent of the heat of combustion. For a small expenditure of energy, the feedstock for the fuel cells can be produced which can generate electricity in a clean efficient manner. The formate can be kept in a water solution in which formate is non-flammable and can be easily handled and transported.

The hydroxide used in reaction (4) is regenerated in reaction (5) and recycled back into reaction (4). Thus, there is no consumable material used in the reaction sequence other than coal. This permits the generation of electricity in a small, compact system without the difficulties of air pollution from the combustion of coal directly. In addition, fuel cells generate electricity with efficiencies up to about 60 percent, whereas combustion coal-fired steam generating systems generate electricity at only about a 30 percent efficiency. Thus, one not only obtains a greater amount of electrical energy for a given amount of coal, but avoids the costly requirements of air pollution equipment and the detrimental effects of pollution on the environment.

Having described my invention, I wish it to be understood that the invention is not meant to be limited solely to the details described herein. Modifications which would be obvious to one of ordinary skill in the art are contemplated to be within the scope of the invention.

What is claimed is:

1. A non-pyrolytic, non-air polluting process of upgrading coal for cleaner and efficient electrical power generation comprising:
   (a) reacting coal with water at a sufficient temperature to form carbon monoxide and hydrogen;
   (b) separating the gases of step (a);
   (c) reacting the carbon monoxide of step (b) with a hydroxide to form a formate;
   (d) reacting the formate of step (c) with oxygen in a fuel cell to form a hydroxide, $CO_2$, and electricity;
   (e) reacting the hydrogen of step (b) with oxygen in a fuel cell to form water and electricity;
   (f) recycling the hydroxide from step (d) to step (e); and
   (g) recycling the water from step (e) to step (a).

2. The method according to claim 1 wherein the temperature is in excess of 1000° C.

3. The process according to claim 2 wherein the heat energy generated during the reactions of steps (c), (d), and (e) is used to heat the reactants of step (a).

4. The process according to claim 3 wherein the hydroxide is selected from the group consisting of sodium hydroxide and potassium hydroxide and mixtures thereof.

5. The process according to claim 3 wherein the carbon dioxide of step (c) is reacted with water in an acidic solution to form the energy storage medium formic acid or formate.

* * * * *

UNITED STATES PATENT AND TRADEMARK OFFICE
CERTIFICATE OF CORRECTION

PATENT NO. : 4,259,414

DATED : March 31, 1981

INVENTOR(S) : Richard Williams

It is certified that error appears in the above-identified patent and that said Letters Patent is hereby corrected as shown below:

Column 4, line 27, delete "(e)" and insert -- (c) --.

Column 4, line 40, delete "(c)" and insert -- (d) --.

Signed and Sealed this

Thirtieth Day of June 1981

[SEAL]

Attest:

RENE D. TEGTMEYER

Attesting Officer

Acting Commissioner of Patents and Trademarks